United States Patent
Yasui (10) Patent No.: US 9,225,722 B2
(45) Date of Patent: Dec. 29, 2015

(54) IMAGE FORMING SYSTEM, IMAGE FORMING APPARATUS, AND RECORDING MEDIUM

(71) Applicant: KYOCERA Document Solutions Inc., Osaka (JP)

(72) Inventor: Toru Yasui, Osaka (JP)

(73) Assignee: Kyocera Document Solutions Inc. (JP)

(*) Notice: Subject to any disclaimer, the term of this patent is extended or adjusted under 35 U.S.C. 154(b) by 0 days.

(21) Appl. No.: 14/187,459

(22) Filed: Feb. 24, 2014

(65) Prior Publication Data

US 2014/0245413 A1  Aug. 28, 2014

(30) Foreign Application Priority Data

Feb. 26, 2013 (JP) .................. 2013-036483

(51) Int. Cl.
| | |
|---|---|
| H04L 9/32 | (2006.01) |
| G06K 15/00 | (2006.01) |
| H04L 29/06 | (2006.01) |
| G06F 3/01 | (2006.01) |
| H04N 1/00 | (2006.01) |
| H04N 1/44 | (2006.01) |

(52) U.S. Cl.
CPC *H04L 63/10* (2013.01); *G06F 3/01* (2013.01); *H04N 1/00244* (2013.01); *H04N 1/00832* (2013.01); *H04N 1/4413* (2013.01); *H04N 1/4433* (2013.01); *H04N 2201/0094* (2013.01)

(58) Field of Classification Search
CPC ....... H04L 63/08; H04L 63/10; G06F 3/1203; G06F 3/01; G06F 21/608; G06F 21/629; H04N 1/0097; H04N 1/4433

USPC .......... 726/2–7, 21; 709/225, 229; 358/1.14, 358/1.15
See application file for complete search history.

(56) References Cited

U.S. PATENT DOCUMENTS

| | | | |
|---|---|---|---|
| 2007/0127051 A1* | 6/2007 | Sakayama et al. | 358/1.14 |
| 2007/0146766 A1* | 6/2007 | Murakami | 358/1.14 |
| 2009/0180141 A1* | 7/2009 | Takaishi et al. | 358/1.15 |
| 2009/0260069 A1* | 10/2009 | Nakajima | 726/7 |
| 2009/0310178 A1* | 12/2009 | Tomita et al. | 358/1.15 |
| 2010/0185858 A1* | 7/2010 | Nishimi et al. | 713/168 |
| 2010/0265531 A1* | 10/2010 | Nitta | 358/1.14 |
| 2010/0265532 A1* | 10/2010 | Katahira | 358/1.14 |
| 2012/0042359 A1* | 2/2012 | Kuroda | 726/3 |
| 2012/0054855 A1* | 3/2012 | Shimizu | 726/19 |

(Continued)

FOREIGN PATENT DOCUMENTS

| | | |
|---|---|---|
| JP | 2004-070708 | 3/2004 |
| JP | 2011-192121 | 9/2004 |
| JP | 2005-065200 | 3/2005 |

(Continued)

*Primary Examiner* — Shanto M Abedin (57) ABSTRACT

In an image forming apparatus, a section managing unit acquires section information and usage restriction information from the server apparatus after succession of the user authentication on a login user and registers a temporal section based on the acquired section information and the acquired usage restriction information as a section within the image forming apparatus. The UI control unit removes logout prohibition to the login user before completion of a job of the login user performed by the image forming apparatus, and the usage restriction managing unit continues to perform usage restriction management of the temporal section for the job until the job is completed even after the login user performs a logout operation.

5 Claims, 8 Drawing Sheets

(56) References Cited

U.S. PATENT DOCUMENTS

| | | | |
|---|---|---|---|
| 2012/0075658 A1* | 3/2012 | Yasui et al. | 358/1.14 |
| 2012/0099136 A1* | 4/2012 | Ueda | 358/1.14 |
| 2012/0192257 A1* | 7/2012 | Ishii | 726/7 |

FOREIGN PATENT DOCUMENTS

| | | |
|---|---|---|
| JP | 2008-042805 | 2/2008 |
| JP | 2008-140067 | 6/2008 |
| JP | 2008-176704 | 7/2008 |

* cited by examiner

| USAGE RESTRICTION INFORMATION IN THE MFP 1A | | USAGE RESTRICTION INFORMATION IN THE SERVER APPARATUS | |
|---|---|---|---|
| ID | FUNCTION ITEM | ID | FUNCTION ITEM |
| a0001 | COPY PRINTING PROHIBITION | 0001 | COPY TOTAL PROHIBITION |
| a0010 | COPY PRINTING PROHIBITION (OF FULL COLOR) | 0002 | COPY FULL COLOR PROHIBITION |
| a0020 | COPY PRINTING PROHIBITION (OF COLOR) | 0003 | COPY MONO COLOR PROHIBITION |
| b0001 | PRINTER PRINTING PROHIBITION | 0004 | PRINTER TOTAL PROHIBITION |
| c0001 | SENDING PROHIBITION | 0005 | OTHER SCANNING PROHIBITION (EXCEPT FOR COPY) |
| d0001 | FACSIMILE TRANSMITTING PROHIBITION | 0006 | FACSIMILE TRANSMITTING PROHIBITION |
| ... | | | |

IMAGE FORMING SYSTEM, IMAGE FORMING APPARATUS, AND RECORDING MEDIUM

CROSS-REFERENCE TO RELATED APPLICATIONS

This application relates to and claims priority rights from Japanese Patent Application No. 2013-036483, filed on Feb. 26, 2013, the entire disclosures of which are hereby incorporated by reference herein.

BACKGROUND

1. Field of the Present Disclosure

The present disclosure relates to an image forming system, an image forming apparatus, and a recording medium.

2. Description of the Related Art

Recently, a directory service such as Active Directory or e Directory is introduced to manage a user and a device in a network system. Today some image forming apparatuses such as printers, copiers, or multi function peripherals have a network function, and are capable of managing a user and a group (a section) using such a directory service. When user management is performed with a directory service, usually, a server apparatus of a directory service performs user authentication for a user who performs a login operation to an image forming apparatus.

On the other hand, some image forming apparatuses perform authorization process to enable a login user to use only a function of which usage is permitted for the login user among sorts of functions. In general, in the authorization process, usage restriction information that specifies a function of which usage is permitted (or a function of which usage is prohibited) is set in the image forming apparatus in advance, and functions that the login user uses are restricted in accordance with the usage restriction information. Further, in some systems, the usage restriction information of the login user is provided to the image forming apparatus using an intermediate server apparatus that includes usage restriction information of each user.

Furthermore, another image forming apparatus includes a usage restriction setting for a section that a user belongs to, and when a user logs in, the image forming apparatus refers to the usage restriction setting of the user to identify a function of which usage is prohibited to the section, and prohibits the login user from using the identified function.

Furthermore, in another system that manages plural multi function peripherals using a server, regarding the aforementioned usage restriction, each one of the plural multi function peripherals informs counter information on a job to the server after the job is executed.

However, in the aforementioned system, since the counter information is totalized in relation with the login user, the image forming apparatus must disable the login user for logging out until the job is completely finished.

Recent image forming apparatuses are designed so as to be enabled to process plural jobs in parallel. However, if the aforementioned system is introduced, then until a job of a user is completely finished, this user can not log out and another user can not log in, and consequently, users can not enjoy user convenience based on high performance of the image forming apparatus.

SUMMARY

An image forming system according to an aspect of the present disclosure includes: an image forming apparatus connected to a network; and a server apparatus connected to the network. The server apparatus is configured to perform user authentication of a login user to the image forming apparatus, and provide section information on a section that the login user belongs to and usage restriction information of the section to the image forming apparatus. The image forming apparatus includes: a UI control unit configured to control a user interface for the login user; a section managing unit configured to register a section within the image forming apparatus and manage the registered section apart from a section managed by the server apparatus; and a usage restriction managing unit configured to perform usage restriction management for the section registered within the image forming apparatus. The section managing unit is further configured to acquire the section information and the usage restriction information from the server apparatus after succession of the user authentication on the login user and register a temporal section based on the acquired section information and the acquired usage restriction information as a section within the image forming apparatus. The UI control unit is further configured to remove logout prohibition to the login user before completion of a job of the login user performed by the image forming apparatus. The usage restriction managing unit is further configured to continue to perform usage restriction management of the temporal section for the job until the job is completed even after the login user performs a logout operation.

An image forming apparatus according to an aspect of the present disclosure includes: a UI control unit configured to control a user interface for a login user of the image forming apparatus; an authentication processing unit configured to perform a user authentication process for the login user using a server apparatus that has a user authentication function and manages section information on a section that a user belongs to and usage restriction information of the section; a section managing unit configured to register a section within the image forming apparatus and manage the registered section apart from a section managed by the server apparatus; and a usage restriction managing unit configured to perform usage restriction management for the section registered within the image forming apparatus. The section managing unit is further configured to acquire the section information and the usage restriction information from the server apparatus after succession of the user authentication on the login user and register a temporal section based on the acquired section information and the acquired usage restriction information as a section within the image forming apparatus. The UI control unit is further configured to remove logout prohibition to the login user before completion of a job of the login user performed by the image forming apparatus. The usage restriction managing unit is further configured to continue to perform usage restriction management of the temporal section for the job until the job is completed even after the login user performs a logout operation.

A non-transitory computer readable recording medium according to an aspect of the present disclosure stores a program. The program causes a computer in an image forming apparatus to act as: a UI control unit controls a user interface for a login user of the image forming apparatus; an authentication processing unit performs a user authentication process for the login user using a server apparatus that has a user authentication function and manages section information on a section that a user belongs to and usage restriction information of the section; a section managing unit registers a section within the image forming apparatus and manage the registered section apart from a section managed by the server apparatus; and a usage restriction managing unit performs usage restriction management for the section registered within the image forming apparatus. The section managing unit further acquires the section information and the usage restriction information from the server apparatus after succession of the user authentication on the login user and register a temporal section based on the acquired section information and the acquired usage restriction information as a section within the image forming apparatus. The UI control unit further removes logout prohibition to the login user before completion of a job of the login user performed by the image forming apparatus. The usage restriction managing unit further continues to perform usage restriction management of the temporal section for the job until the job is completed even after the login user performs a logout operation.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
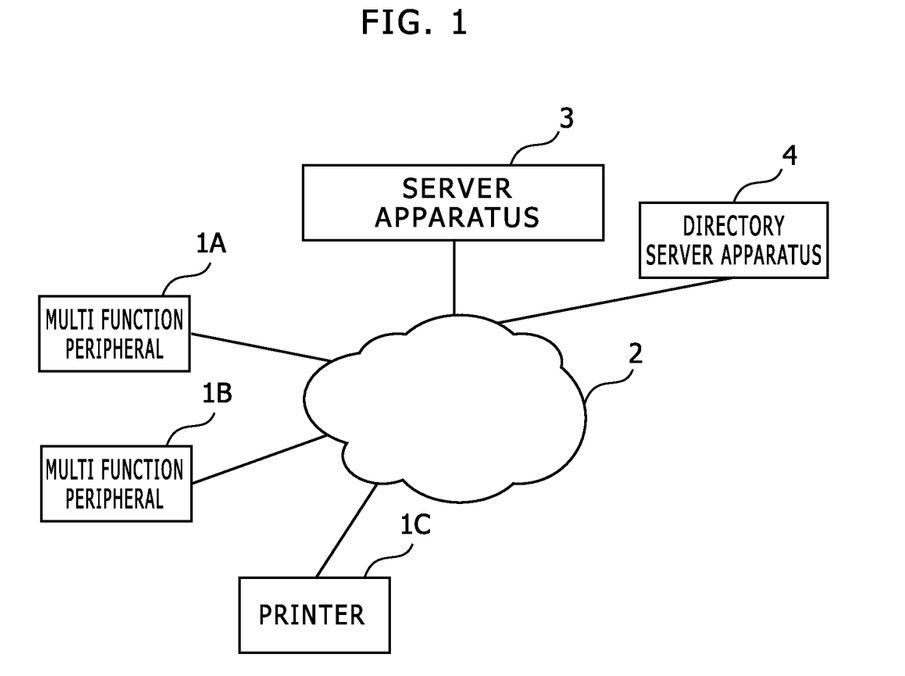
FIG. 1 shows a configuration of an image forming system according to an embodiment of the present disclosure.

FIG. 1 shows a configuration of an image forming system according to an embodiment of the present disclosure. In the system shown in FIG. 1, plural multi function peripherals 1A and 1B, and a printer 1C are connected to a network 2, and further a server apparatus 3 and a directory server apparatus 4 are connected to the network 2. The printer 1C is an image forming apparatus as well as the multi function peripherals 1A and 1B, but does not have a scanner function, a copy function and a facsimile function. Hereinafter, a case is mainly explained in which the multi function peripherals 1A and 1B act as image forming apparatuses.

In this system, the multi function peripheral 1A or 1B, as a stand-alone device, has a section management function (e.g. a usage restriction function for each section). On the other hand, the server apparatus 3 has (a) a user authentication function and (b) a function to manage section information on a section that a user belongs to and usage restriction information for the section, and is provided for section management of the plural multi function peripherals 1A and 1B in the system.

The multi function peripheral 1A is an image forming apparatus that has a printer function, a scanner function, a copy function, a facsimile function and the like, and performs sorts of jobs using the aforementioned functions in accordance with instructions from an operation panel of the multi function peripheral 1A, a host device connected to the network 2 or the like. The multi function peripheral 1B is an image forming apparatus as well as the multi function peripheral 1A.

The server apparatus 3 receives a user authentication request from the multi function peripheral 1A or 1B and provides section information (i.e. property information such as a section ID and a section name) and usage restriction information of a section that a login user who logs in the multi function peripheral 1A or 1B belongs to. The directory server apparatus 4 is a server apparatus that provides a directory service such as Active Directory or e Directory.

Figure 2:
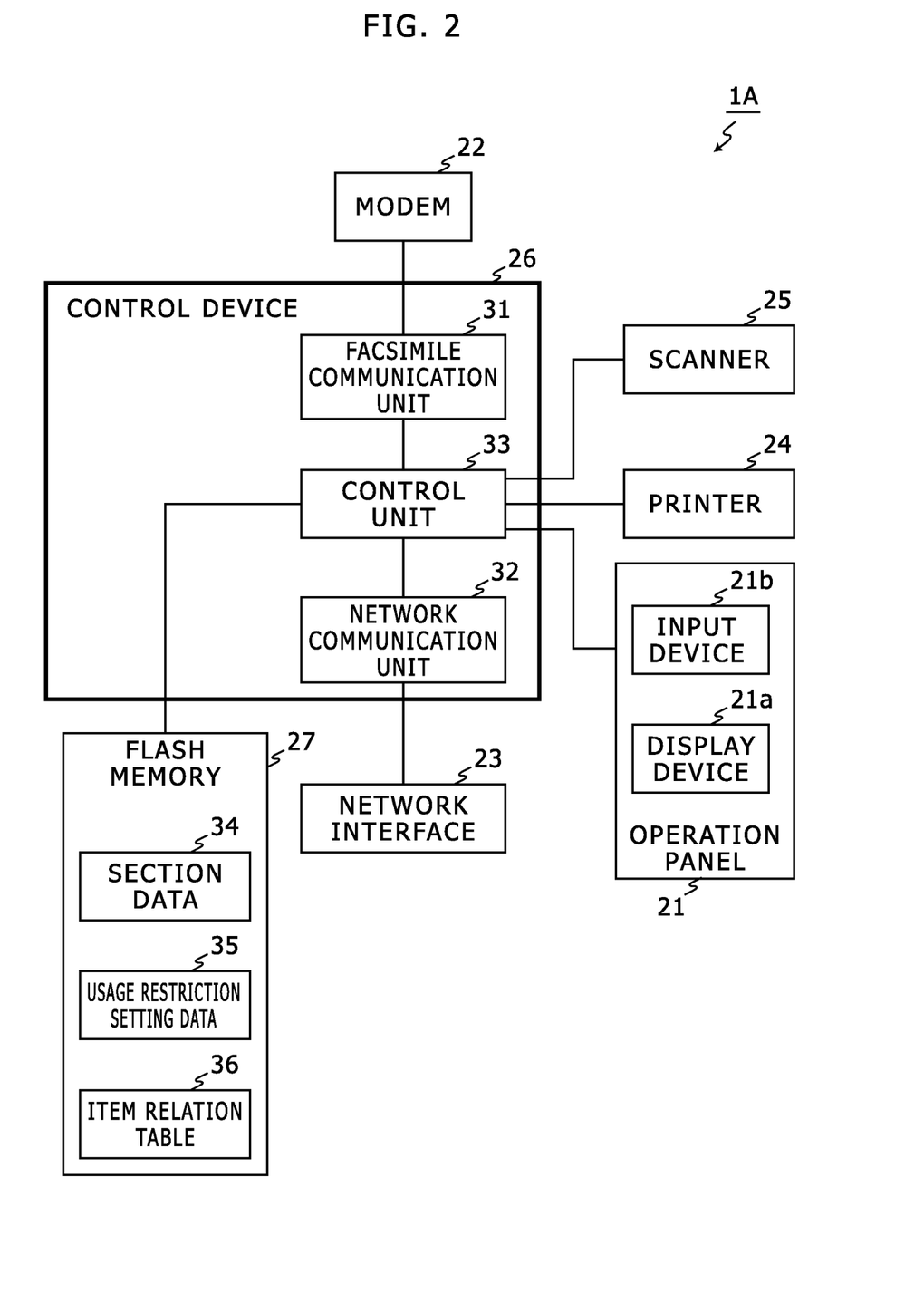
FIG. 2 shows a configuration of a multi function peripheral shown in FIG. 1.

FIG. 2 shows a configuration of the multi function peripheral 1A shown in FIG. 1. The multi function peripheral 1B has the same configuration. The multi function peripheral 1A includes an operation panel 21, a modem 22, a network interface 23, a printer 24, a scanner 25, a control device 26, and a flash memory 27.

The operation panel 21 is a user interface arranged on a housing of the multi function peripheral 1A, and includes a display device 21a that displays sorts of information to a user and an input device 21b that receives a user operation. The display device 21a includes, for example, a liquid crystal display, sorts of indicators or the like. The input device 21b includes, for example, a touch panel, a key switch or the like.

The modem 22 is a communicating device that is capable of connecting to a subscriber telephone line network such as Public Switched Telephone Network (PSTN) and transmits and receives facsimile data.

The network interface 23 a device that is capable of connecting to the wired or wireless computer network 2 and performs data communication with another device connected to the network 2 (such as the server apparatus 3, an unshown host device or the like).

The printer 24 is an internal device that performs printing on a paper sheet in accordance with a print request and outputs a printed matter. In case of an electrographic manner, the printer 24 forms an electrostatic latent image on a surface of a photo conductor drum by causing a light source to irradiate light based on print data after charging the photo conductor drum, develops a toner image from the electrostatic latent image with toner, fixes the toner image on a paper sheet, and outputs the paper sheet as a printed matter.

The scanner 25 is an internal device that irradiates light to either a single side or double sides of either a document fed by an automatic document feeding device or a document put by a user, receives its reflection light or the like to read a document image, and outputs the document image as image data.

The flash memory 27 is a rewritable non volatile storage device and stores section data 34, usage restriction setting data 35, and an item relation table 36.

The section data 34 is data that includes property information (i.e. registration information on a section) on a section registered within the multi function peripheral 1A.

It should be noted that registration information on a temporal section mentioned below is also stored as the section data 34 in the flash memory 27.

The usage restriction setting data 35 is data used to determine (a) a function that a user who belongs to a section is prohibited from usage and/or (b) a condition of usage prohibition.

The item relation table 36 is data that indicates a relation between a function item in the usage restriction setting data 35 and a function item in usage restriction information provided from the server apparatus 3.

Figure 3:
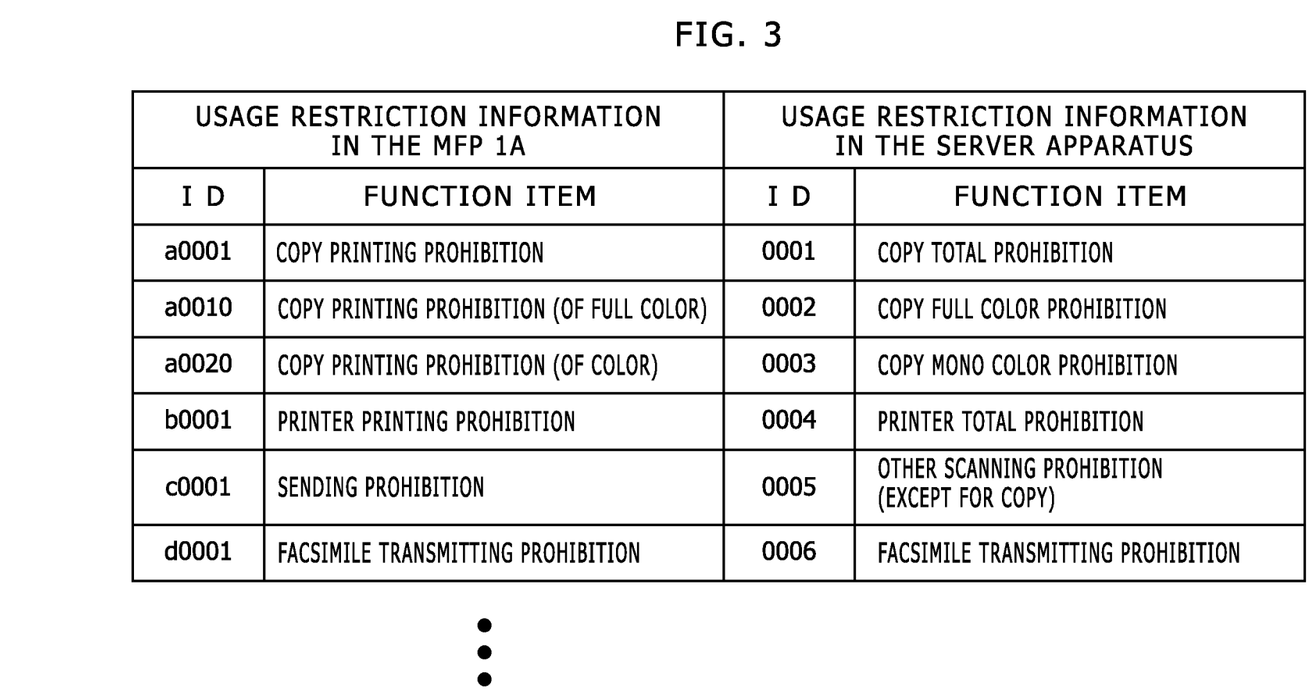
FIG. 3 shows an example of an item relation table shown in FIG. 2.

FIG. 3 shows an example of the item relation table 36 shown in FIG. 2. In the usage restriction information in the usage restriction setting data 35 or the usage restriction information provided from the server apparatus 3, IDs are assigned to respective function items, and a relation between both IDs of usage restriction information is described in the item relation table 36. Therefore, by referring the item relation table 36, it is possible to identify a function item in the usage restriction setting data 35 corresponding to a function item in the usage restriction information provided from the server apparatus 3. If same IDs are assigned to two function items corresponding to each other, the item relation table 36 is not necessary.

The control device 26 is a device that controls units in the multi function peripheral 1A and performs data processing. For example, the control device 26 is configured as a computer that includes a CPU (Central Processing Unit), a ROM (Read Only Memory), a RAM (Random Access Memory), and so forth. In the control device 26, the CPU loads a program stored in the ROM or another storage device (e.g. the flash memory 27) to the RAM and executes the program to form sorts of processing units.

In the control device 26, a facsimile communication unit 31, a network communication unit 32, and a control unit 33 are formed.

The facsimile communication unit 31 is a processing unit that controls the modem 22 and receives facsimile data. Upon receiving the facsimile data, the facsimile communication unit 31 provides a print request to the control unit 33.

The network communication unit 32 is a processing unit that controls the network interface 23 and performs data communication with a device on the network 2 in accordance with sorts of communication protocols.

For example, the network communication unit 32 receives a print request such as PDL (Page Description Language) data from a host computer, and provides the print request to the control unit 33.

The control unit 33 performs communication with an unshown host device, the server apparatus 3 or the like using the network interface 23 and the network communication unit 32. The control unit 33 receives a job request based on a user operation to the operation panel 21 or a job request received from a host device by the network interface 23 and the network communication unit 32, and executes a job corresponding to the job request by controlling the units inside of the multi function peripheral 1A. The job request is a print job request, a scan job request, a copy job request, or the like.

Figure 4:
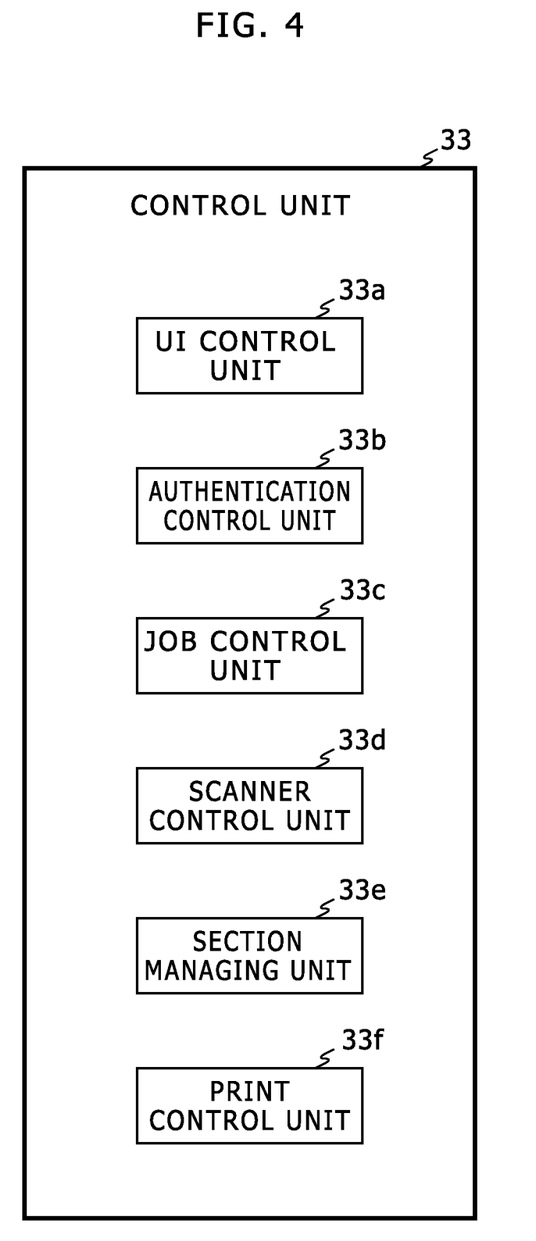
FIG. 4 shows an example of a configuration of a control unit shown in FIG. 2.

FIG. 4 shows an example of a configuration of the control unit 33 shown in FIG. 2.

The control unit 33 shown in FIG. 4 includes a UI control unit 33a, an authentication control unit 33b, a job control unit 33c, a scanner control unit 33d, a section managing unit 33e, and a print control unit 33f.

The UI control unit 33a controls the operation panel 21 as a user interface for a login user of the multi function peripheral 1A.

The authentication control unit 33b has (a) an authentication processing function that performs a user authentication process for a login user using the server apparatus 3 and (b) a usage restriction managing function that performs usage restriction management of a section registered within the multi function peripheral 1A apart from the server apparatus 3.

In the authentication processing function, upon a login operation to the operation panel 21, the authentication control unit 33b requests user authentication to the server apparatus 3 using the network communication unit 32, and acquires section information and usage restriction information on a login user from the server apparatus after succession of the user authentication on the login user.

The usage restriction management includes usage prohibition of a function and management of counter information. In the management of counter information, a count value of a specific event such as print of one page is renewed every time when the event is detected, and the count value is included in the counter information. When and after the count value reaches to a specific upper limit value, the authentication control unit 33b prohibits usage of a function corresponding to the count value. Thus, the authentication control unit 33b is capable of usage restriction management for each section in stand-alone status.

In this embodiment, the authentication control unit 33b registers a temporal section based on the usage restriction information acquired from the server apparatus 3 as a section within the multi function peripheral 1A, and sets counter information on a job. After completion of the job, the counter information renewed in the usage restriction management for the temporal section is transmitted to the server apparatus 3. Therefore, the server apparatus 3 is capable of centralized management of the counter information using the usage restriction function for a local section within a multi function peripheral.

The job control unit 33c executes a job using the scanner control unit 33d, the print control unit 33f or the like.

The scanner control unit 33d controls the scanner 25.

The section managing unit 33e registers a section within the multi function peripheral 1A and manages the registered section apart from a section managed by the server apparatus 3. Therefore, the section managing units 33e of the multi function peripherals 1A and 1B independently performs section management within respective ones of the multi function peripherals 1A and 1B.

The print control unit 33f controls the printer 24.

In this embodiment, the section managing unit 33e acquires section information and usage restriction information from the server apparatus 3 after succession of the user authentication on the login user, and registers a temporal section based on the acquired section information and the acquired usage restriction information as a section within the multi function peripheral 1A.

The UI control unit 33a removes logout prohibition to the login user before completion of a job of the login user performed by the multi function peripheral 1A, and the authentication control unit 33b continues to perform usage restriction management of the temporal section for the job until the job is completed even after the login user performs a logout operation.

Further, in this embodiment, the section managing unit 33e deletes registration of the temporal section upon completion of the job if the login user performs the logout operation before completion of the job. If the login user performs the logout operation after completion of the job, registration of the temporal section is deleted upon detecting the logout operation.

The multi function peripherals 1A and 1B are configured as mentioned.

Figure 5:
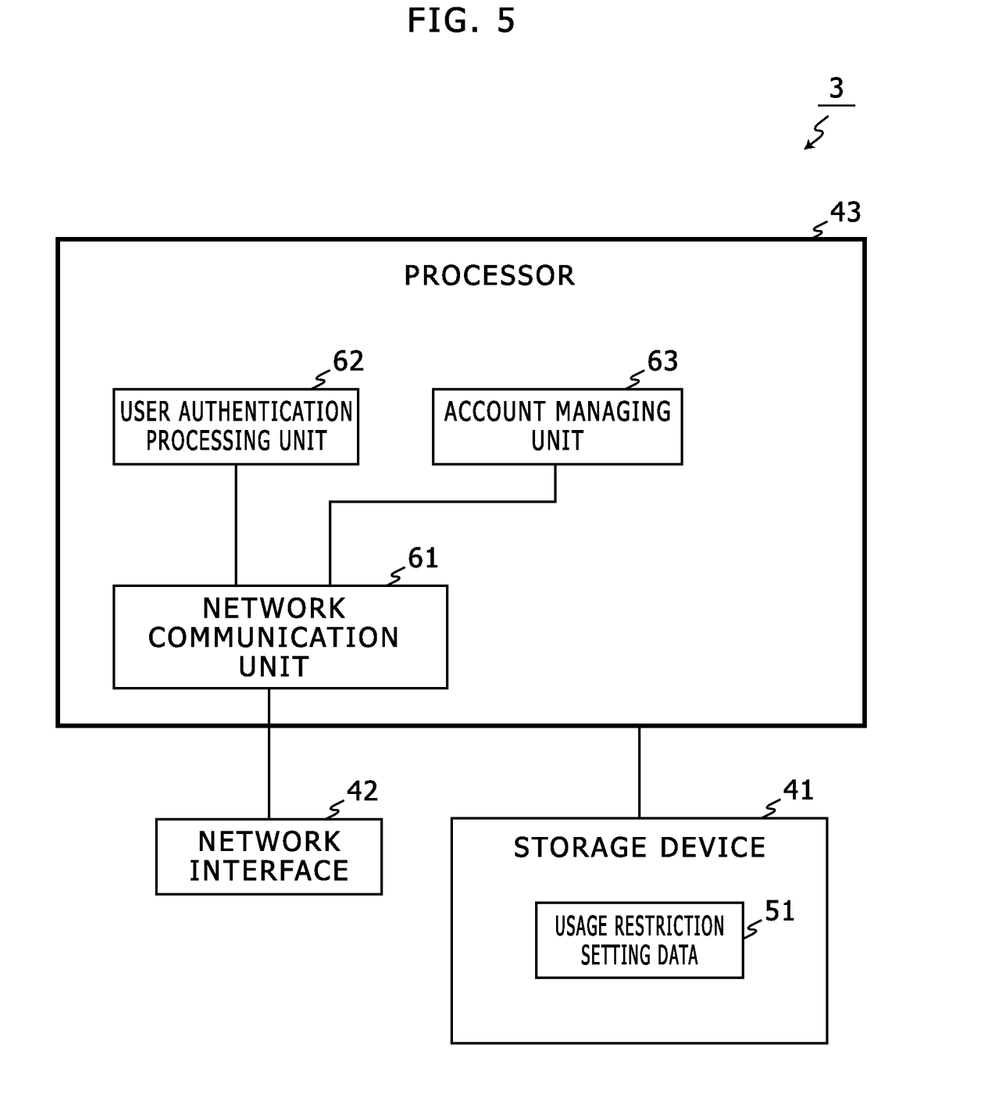
FIG. 5 shows a configuration of a server apparatus shown in FIG. 1.

FIG. 5 shows a configuration of the server apparatus 3 shown in FIG. 1. The server apparatus 3 includes a storage device 41, a network interface 42, and a processor 43.

The storage device 41 is a device in which a program and data are stored. A non volatile semiconductor memory, a hard disk drive, or the like is used as the storage device 41. In the storage device 41, usage restriction setting data 51 is stored. The usage restriction setting data 51 includes usage restriction information of a section set on the server side (i.e. set in the server apparatus 3 or the directory server apparatus 4).

The processor 43 is configured as a computer that includes a CPU, a ROM, a RAM and so forth, and loads a program stored in the ROM or the storage device 41 to the RAM and executes the program to form sorts of processing units. In the processor 43, a network communication unit 61, a user authentication processing unit 62, and an account managing unit 63 are formed.

The network communication unit 61 controls the network interface 42 and performs data communication with a device on the network 2 in accordance with sorts of communication protocols. For example, the network communication unit 61 receives a user name (a user ID) and a password from the multi function peripheral 1A and transmits usage restriction information on the user to the multi function peripheral 1A.

The user authentication processing unit 62 causes the directory server apparatus 4 to perform authentication for a login user of the multi function peripheral 1A or 1B in accordance with a request from the multi function peripheral 1A or 1B using the network interface 42 and the network communication unit 61, and transmits a result of the user authentication to the multi function peripheral 1A or 1B.

The account managing unit 63 acquires account information on a login user of the multi function peripheral 1A or 1B after succession of the user authentication in accordance with a request from the multi function peripheral 1A or 1B, and transmits the account information as a response to the request. Further, the account managing unit 63 performs centralized management for usage restriction information of the multi function peripherals 1A and 1B, apart from local usage restriction information of the respective multi function peripherals 1A and 1B. The usage restriction management information includes counter information (e.g. number of printed paper sheets) of each item that indicates a function of which usage is prohibited when the counter information exceeds a fixed condition.

Here the account managing unit 63 determines section information on the login user using unshown registration information within the server apparatus 3 or a directory service of the directory server apparatus 4, reads usage restriction information on the section from the usage restriction setting data 51, and transmits the section information and the usage restriction information on the section as a response.

The server apparatus 3 is configured as mentioned.

Figure 6:
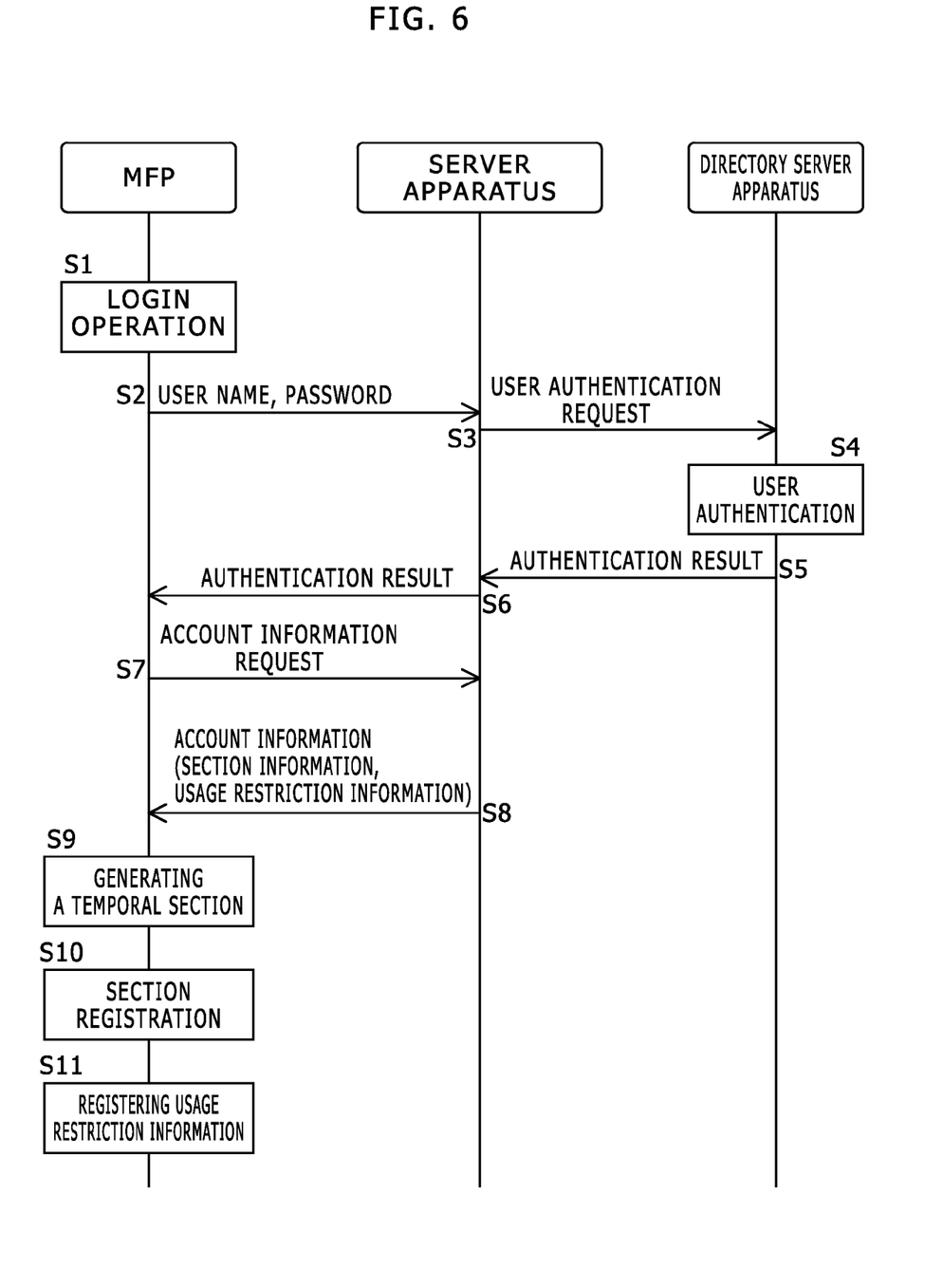
FIG. 6 shows a behavior of each apparatus when a user logs in a multi function peripheral in the system shown in FIG. 1.

In the following part, explained is a behavior of each apparatus when a user logs in the multi function peripheral 1A in the aforementioned system. FIG. 6 shows a behavior of each apparatus when a user logs in the multi function peripheral (MFP) 1A in the system shown in FIG. 1. Each apparatus also acts in the same manner when a user logs in the multi function peripheral 1B.

When the operation panel 21 of the multi function peripheral 1A detects a user operation to input a user name (a user ID) and a password (Step S1), the UI control unit 33a detects the user operation and the authentication control unit 33b transmits the user name and the password to the server apparatus 3 using the network communication unit 32 and the network interface 23 (Step S2).

In the server apparatus 3, the user authentication processing unit 62 receives the user name and the password using the network communication unit 61 and the network interface 42, and transmits the user name and the password and an authentication request to the directory server apparatus 4 using a specific protocol (e.g. LDAP) (Step S3).

The directory server apparatus 4 performs user authentication corresponding to the authentication request using the directory service (Step S4), and transmits a result of the user authentication to the server apparatus 3 (Step S5).

In the server apparatus 3, the user authentication processing unit 62 receives the authentication result as a response to the authentication request and transmits the authentication result to the multi function peripheral 1A (Step S6).

In the multi function peripheral 1A, the authentication control unit 33b receives the authentication result, and if the user authentication is succeeded, the authentication control unit 33b requests account information on the user from the server apparatus 3 (Step S7).

In the server apparatus 3, the account managing unit 63 receives the request, acquires section information and usage restriction information on a section that the user belongs to, and transmits the section information and the usage restriction information to the multi function peripheral 1A as a response to the request (Step S8).

In the multi function peripheral 1A, the authentication control unit 33b receives the section information and the usage restriction information, and subsequently the section managing unit 33e generates section data 34 of a temporal section on the basis of the section information (Step S9), and registers the temporal section by storing the section data 34 in the flash memory 27 (Step S10). Further, the section managing unit 33e generates usage restriction setting data 35 related to the temporal section on the basis of the received usage restriction information, and registers the usage restriction setting data 35 (Step S11).

The temporal section is a local section temporarily registered within the multi function peripheral 1A.

As mentioned, when a user logs in, (a) a temporal section corresponding to a section that the user belongs to on the server side is generated and registered within the multi function peripheral 1A, and (b) usage restriction set to the section on the server side is applied to the temporal section.

Figure 7:
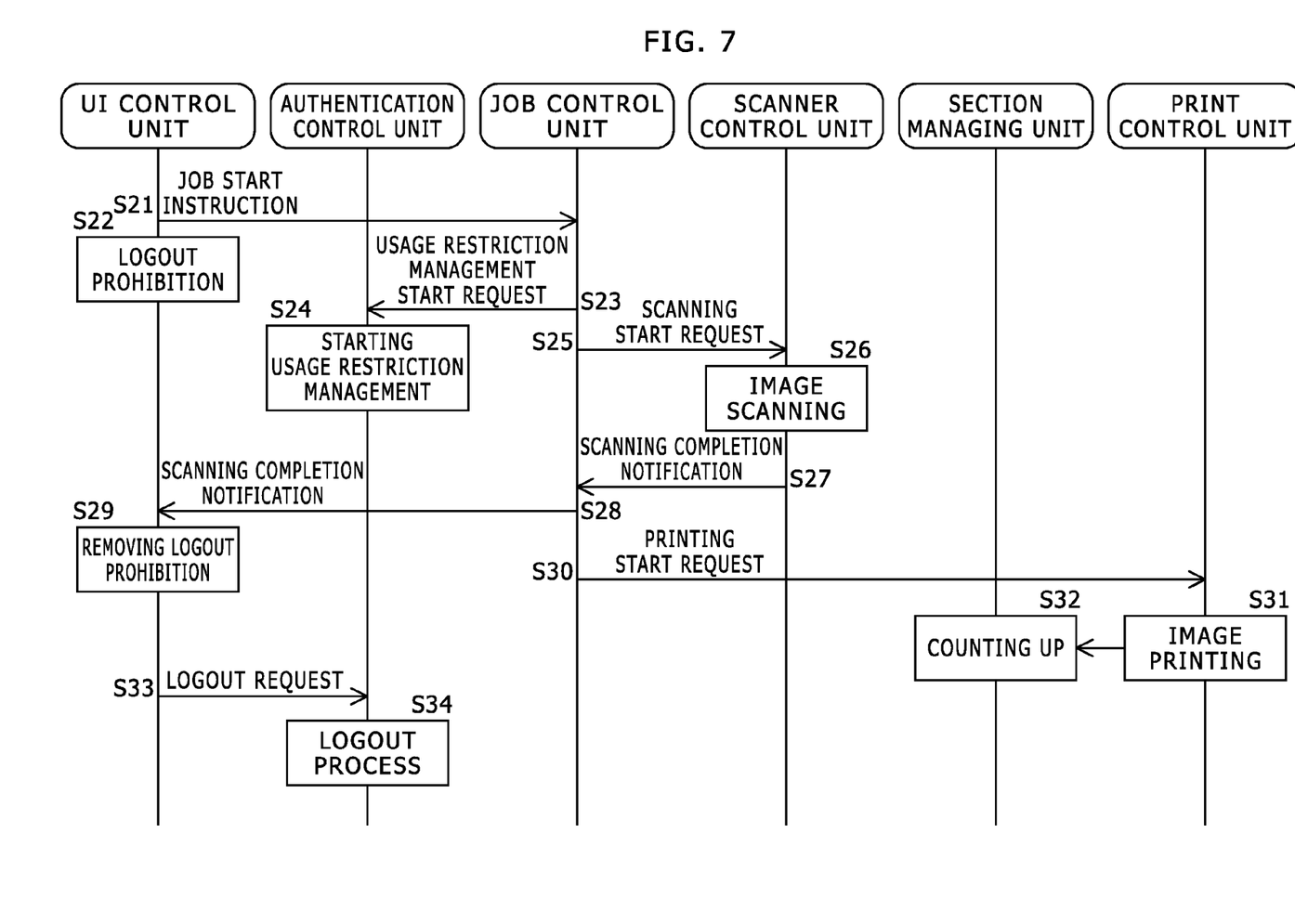
FIG. 7 shows a behavior of a multi function peripheral shown in FIG. 1 when a login user performs a job execution operation to the multi function peripheral shown in FIG. 1 (the first diagram)
Figure 8:
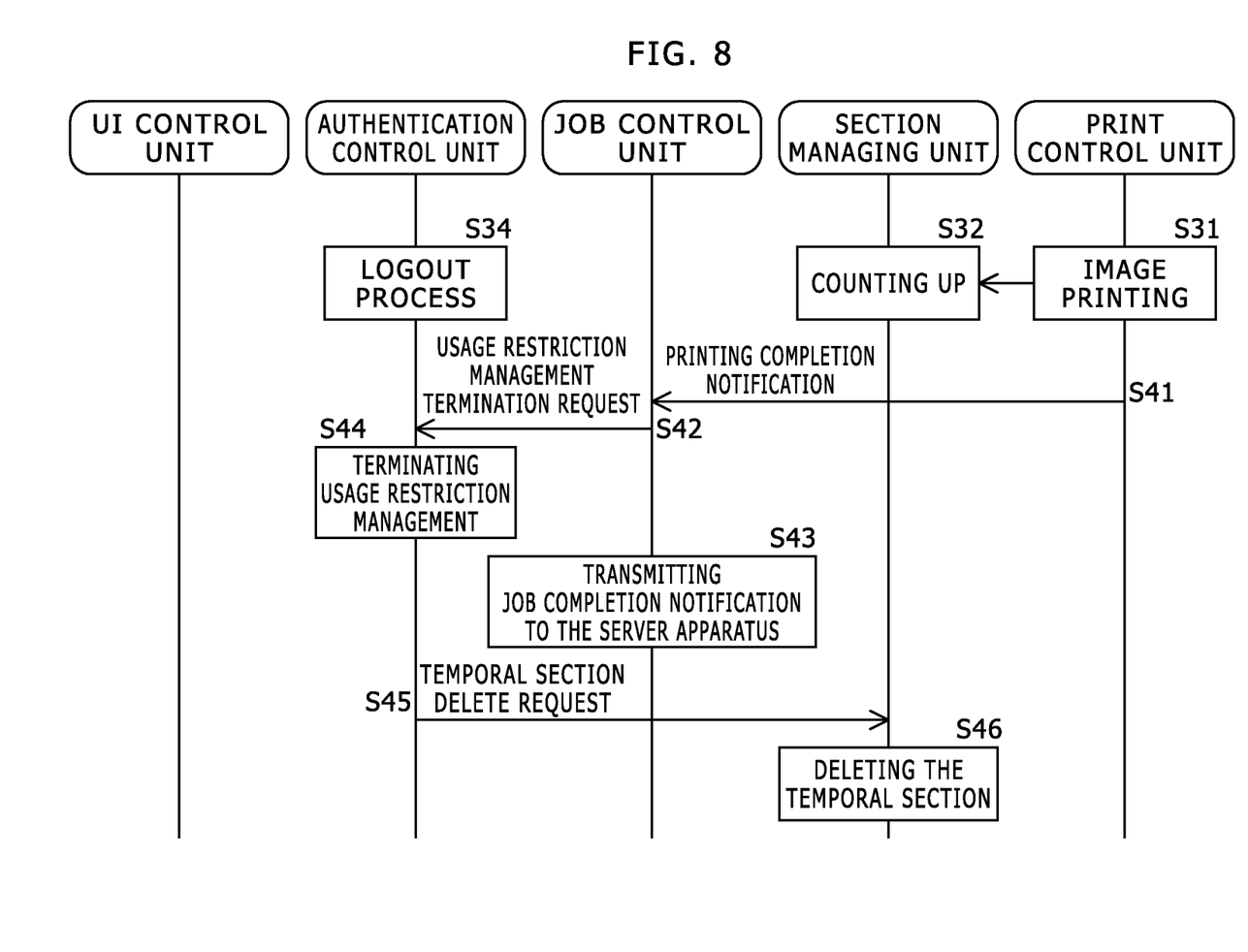
FIG. 8 shows a behavior of a multi function peripheral shown in FIG. 1 when a login user performs a job execution operation to the multi function peripheral shown in FIG. 1 (the second diagram).

In the following part, explained is a behavior of the multi function peripheral 1A when a login user performs a job execution operation to the multi function peripheral 1A in the aforementioned system. FIG. 7 and FIG. 8 show a behavior of the multi function peripheral 1A shown in FIG. 1 when a login user performs a job execution operation to the multi function peripheral 1A shown in FIG. 1.

Here explained is a behavior of the multi function peripheral 1A when a login user performs a job execution operation for a copy job.

When a login user performs a job execution operation for a copy job to the operation panel 21, upon detecting this operation, the UI control unit 33a outputs a job start instruction (including a scan condition and a print condition specified by the user) for a copy job to the job control unit 33c (Step S21), and prohibits the login user from logging out (Step S22). For example, even if a logout button in the operation panel 21 is pressed down, a logout process is not performed so as to prohibit logout.

Upon receiving the job start instruction, the job control unit 33c firstly outputs a usage restriction management start instruction for the login user on the copy job to the authentication control unit 33b (Step S23).

Upon receiving the usage restriction management start instruction, the authentication control unit 33b starts usage restriction management on this copy job (Step S24). In the usage restriction management, for example, the authentication control unit 33b watches counter information that includes a count value of an item such as the number of printed paper sheet, and prohibits usage of a function corresponding to this item when the count value included in the counter information reaches an upper limit value.

In addition, upon receiving the job start instruction, the job control unit 33c outputs a scanning start instruction (including the scan condition) to the scanner control unit 33d (Step S25).

Upon receiving the scanning start instruction, the scanner control unit 33d causes the scanner 25 to start scanning a document image under the scan condition (Step S26). When scanning the document image is completed, the scanner control unit 33d outputs a scanning completion notification to the job control unit 33c (Step S27).

Upon receiving the scanning completion notification, the job control unit 33c outputs a scanning completion notification (or a logout prohibition removing instruction) to the UI control unit 33a (Step S28).

Upon receiving the scanning completion notification (or the logout prohibition removing instruction), the UI control unit 33e removes logout prohibition (Step S29).

Therefore, if the scanning has been completed, the login user can log out at any timing without waiting for printing of copy output.

In addition, upon receiving the scanning completion notification, the job control unit 33c outputs a printing start request (including the print condition) to the print control unit 33f (Step S30).

Upon the printing start request, the print control unit 33f causes the printer 24 to print the document image scanned in Step S26 under the print condition (Step S31).

In this process, the section managing unit 33e renews counter information in response to an event that occurs in printing by the print control unit 33f (Step S32).

Meanwhile, after removing logout prohibition in Step S29, if the login user performs a logout operation to the operation panel 21, the UI control unit 33a detects this operation, and outputs a logout request to the authentication control unit 33b (Step S33).

Upon receiving the logout request, the authentication control unit 33b performs a logout process (Step S34). In the logout process, for example, a request for transition of an operation screen displayed on the operation panel 21 to a login screen as an initial screen is outputted to the UI control unit 33a. After the login user logs out, another user can log in the multi function peripheral 1A.

As mentioned, even if the login user logs out before completion of copy output, as shown in FIG. 8, the print process (in Step S31) is continued, and for the login user who has logged out, the usage restriction management in the authentication control unit 33b and renewal of the counter information by the section managing unit 33e are also continued.

Afterward, when printing of the copy output is completed, the print control unit 33f outputs a printing completion notification to the job control unit 33c (Step S41).

Upon receiving the printing completion notification, the job control unit 33c determines that the copy job is completed, and outputs a usage restriction management termination request of the copy job to the authentication control unit 33b (Step S42).

In addition, when the job control unit 33c determines that the copy job is completed, the job control unit 33c transmits a job completion notification together with the current counter information to the server apparatus 3 (Step S43). In the server apparatus 3, the account managing unit 63 receives the counter information, and renews counter information included in the usage restriction setting data 51 in the server apparatus 3 using the received counter information. In this process, as the counter information, the job control unit 33c may transmit addition of the count value increased in the aforementioned copy job. In this case, the account managing unit 63 adds the addition of the count values indicated by the counter information to the count value included in the usage restriction setting data 51.

On the other hand, upon receiving the usage restriction management termination request, the authentication control unit 33b terminates the usage restriction management (Step S44), and outputs a temporal section delete request of the temporal section registered for the login user who requests the copy job to the section managing unit 33e (Step S45). Upon receiving the temporal section delete request, the section managing unit 33e deletes the section data 34 and the usage restriction setting data 35 of the temporal section (Step S46).

Therefore, if an uncompleted residual job (for example, the aforementioned copy job) exists when a user logs out, the authentication control unit 33b keeps this user's identification information (e.g. a user ID) related to this job even after the logout, and when the job is completed, the authentication control unit 33b causes to remove a temporal section registered for the user related to the job.

In the aforementioned embodiment, the multi function peripheral 1A has a local section managing function that registers a section within the multi function peripheral 1A using the section managing unit 33e and manages the registered section apart from a section managed by the server apparatus 3. The section managing unit 33e acquires section information and usage restriction information on a login user from the server apparatus 3 after succession of user authentication on the login user and registers a temporal section based on the acquired section information and the acquired usage restriction information as a section within the multi function peripheral 1A. The UI control unit 33a removes logout prohibition to the login user before completion of a job of the login user performed by the multi function peripheral 1A. The authentication control unit 33b continues to perform usage restriction management of the temporal section for the job until the job is completed even after the login user performs a logout operation.

Therefore, under a condition that usage restriction management of a section is performed for each user, a waiting time until a job of another user is completed is reduced and consequently user convenience is enhanced.

The description has been presented for purposes of illustration and description, and is not intended to be exhaustive or limited.

For example, in the aforementioned embodiment, the section managing unit 33e may delete the registration information of the temporal section stored in the flash memory 27 if the registration information exists in the flash memory 27 when the image forming apparatus 1A starts. Consequently, for example, the registration information on the temporal section of a login user when a power cut occurs on the multi function peripheral 1A is properly deleted.

Further, in the aforementioned embodiment, the control unit 33 may store and use the registration information on the temporal information on the RAM.

Furthermore, in the aforementioned embodiment, the server apparatus 3 may maintain user data of a registered user and perform user authentication on the basis of the user data, without using the directory server apparatus 4. In such case, the user data includes information on a section that a user belongs to.

Furthermore, in the aforementioned embodiment, upon completion of the job, the counter information is transmitted to the server apparatus. Alternatively, the counter information may be transmitted to the server apparatus 3 every time when the counter information is renewed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system, comprising:
   an image forming apparatus connected to a network; and
   a server apparatus connected to the network;
   wherein the server apparatus performs user authentication of a login user to the image forming apparatus, and provides section information on a section that the login user belongs to and usage restriction information of the section to the image forming apparatus; and
   the image forming apparatus comprises:
      a processor capable of running software units;
      a job control unit running on the processor that executes a job;
      a UI control unit running on the processor that controls a user interface for the login user;
      a section managing unit running on the processor that registers a section within the image forming apparatus and manages the registered section apart from a section managed by the server apparatus; and
      a usage restriction managing unit running on the processor that perform usage restriction management for the section registered within the image forming apparatus;
      wherein the section managing unit acquires the section information and the usage restriction information from the server apparatus after success of the user authentication on the login user and registers a temporal section based on the acquired section information and the acquired usage restriction information as a section within the image forming apparatus;
      the UI control unit outputs a job start instruction to the job control unit and prohibits the login user from manually logging out upon detecting a job execution operation performed by the login user for a job and removes logout prohibition to the login user before completion of the job and after starting the job;
      upon receiving the job start instruction, the job control unit firstly outputs a usage restriction management start instruction for the login user to the usage restriction managing unit and subsequently starts the job;
      after receiving the usage restriction management start instruction, the usage restriction managing unit continues to perform usage restriction management of the temporal section for the job until the job is completed even after the login user performs a logout operation; and
      wherein the usage restriction managing unit is further configured to (a) count a specific event and renew counter information on the event, (b) perform the usage restriction management on the basis of the counter information; and after completion of the job, the counter information renewed in the usage restriction management for the temporal section is transmitted to the server apparatus.

2. An image forming apparatus, comprising:
   A hardware processor;
   a job control unit configured to run on the processor and to execute a job;
   a UI control unit configured to run on the processor and to control a user interface for a login user of the image forming apparatus;
   an authentication processing unit configured to run on the processor and to perform a user authentication process for the login user using a server apparatus that has a user authentication function and manages section information on a section that a user belongs to and usage restriction information of the section;
   a section managing unit configured to run on the processor and to register a section within the image forming apparatus and manage the registered section apart from a section managed by the server apparatus; and
   a usage restriction managing unit configured to run on the processor and to perform usage restriction management for the section registered within the image forming apparatus;
   wherein the section managing unit is further configured to acquire the section information and the usage restriction information from the server apparatus after user authentication on the login user and register a temporal section based on the acquired section information and the acquired usage restriction information as a section within the image forming apparatus;
   the UI control unit is further configured to output a job start instruction to the job control unit and to prohibit the login user from manually logging out upon detecting a job execution operation performed by the login user for a job and to remove logout prohibition to the login user before completion of a job and after starting a job;
   the job control unit is further configured to output a usage restriction management start instruction for the login user to the usage restriction managing unit upon receiving the job start instruction and then to start the job;
   the usage restriction managing unit is further configured to continue to perform usage restriction management of the temporal section for the job, upon receiving the usage restriction management start instruction, until the job is completed even after the login user performs a logout operation; and
   wherein the usage restriction managing unit is further configured to (a) count a specific event and renew counter information on the event, (b) perform the usage restriction management on the basis of the counter information; and after completion of the job, the counter information renewed in the usage restriction management for the temporal section is transmitted to the server apparatus.

3. The image forming apparatus according to claim 2, wherein the section managing unit is further configured to delete registration of the temporal section upon completion of the job if the login user performs the logout operation before completion of the job.

4. The image forming apparatus according to claim 2, further comprising a non volatile storage device in which registration information on the temporal section is stored;

wherein the section managing unit is further configured to delete the registration information of the temporal section stored in the non volatile storage device if the registration information exists in the non volatile storage device when the image forming apparatus starts.

5. A non-transitory computer readable recording medium storing a program, the program running on a processor in a computer that causes the computer in an image forming apparatus to act as:
- a job control unit that executes a job
- a UI control unit that controls a user interface for a login user of the image forming apparatus;
- an authentication processing unit that performs a user authentication process for the login user using a server apparatus that has a user authentication function and manages section information on a section that a user belongs to and usage restriction information of the section;
- a section managing unit that registers a section within the image forming apparatus and manage the registered section apart from a section managed by the server apparatus; and
- a usage restriction managing unit that performs usage restriction management for the section registered within the image forming apparatus;
- wherein the section managing unit further acquires the section information and the usage restriction information from the server apparatus after succession of the user authentication on the login user and register a temporal section based on the acquired section information and the acquired usage restriction information as a section within the image forming apparatus;
- the UI control unit outputs a job start instruction to the job control unit and prohibits the login user from manually logging out upon detecting a job execution operation performed by the login user for a job and further removes logout prohibition to the login user before completion of a job of the login user and after the start of the job;
- upon receiving the job start instruction, the job control unit firstly outputs a usage restriction management start instruction for the login user to the usage restriction managing unit and subsequently starts the job;
- after receiving the usage restriction management start instruction, the usage restriction managing unit further continues to perform usage restriction management of the temporal section for the job until the job is completed even after the login user performs a logout operation; and
- wherein the usage restriction managing unit is further configured to (a) count a specific event and renew counter information on the event, (b) perform the usage restriction management on the basis of the counter information; and after completion of the job, the counter information renewed in the usage restriction management for the temporal section is transmitted to the server apparatus.

* * * * *